United States Patent
Matsunami et al.

(10) Patent No.: US 7,464,222 B2
(45) Date of Patent: Dec. 9, 2008

(54) STORAGE SYSTEM WITH HETEROGENOUS STORAGE, CREATING AND COPYING THE FILE SYSTEMS, WITH THE WRITE ACCESS ATTRIBUTE

(75) Inventors: Naoto Matsunami, Hayama (JP); Koji Sonoda, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 10/822,700

(22) Filed: Apr. 13, 2004

(65) Prior Publication Data

US 2005/0182900 A1    Aug. 18, 2005

(30) Foreign Application Priority Data

Feb. 16, 2004    (JP) ............................. 2004-037596

(51) Int. Cl.
*G06F 12/16*    (2006.01)
*G06F 15/16*    (2006.01)
*G06F 17/00*    (2006.01)

(52) U.S. Cl. .................. 711/114; 709/213; 707/100

(58) Field of Classification Search .................. None
See application file for complete search history.

(56) References Cited

U.S. PATENT DOCUMENTS

| | | | |
|---|---|---|---|
| 5,537,585 A | | 7/1996 | Blickenstaff et al. |
| 5,659,704 A | | 8/1997 | Burkes et al. |
| 5,719,983 A | * | 2/1998 | Henderson et al. ............ 386/70 |
| 5,787,485 A | * | 7/1998 | Fitzgerald et al. ............ 711/162 |
| 5,794,255 A | | 8/1998 | Hayashi et al. |
| 6,098,129 A | | 8/2000 | Fukuzawa et al. ............. 710/65 |
| 6,338,110 B1 | * | 1/2002 | van Cruyningen .......... 710/317 |
| 6,654,830 B1 | * | 11/2003 | Taylor et al. .................. 710/74 |
| 6,766,359 B1 | * | 7/2004 | Oliveira et al. ............... 709/213 |
| 6,889,302 B2 | | 5/2005 | Gibble et al. |
| 7,007,048 B1 | * | 2/2006 | Murray et al. ............... 707/204 |
| 7,043,665 B2 | * | 5/2006 | Kern et al. ....................... 714/5 |
| 2001/0051955 A1 | * | 12/2001 | Wong .......................... 707/201 |

(Continued)

FOREIGN PATENT DOCUMENTS

EP        466389        1/1992

(Continued)

OTHER PUBLICATIONS

Y. Yasuda, et al, "Concept and Evaluation of X-NAS: a Highly Scalable NAS System", Proceedings of the 20th IEEE/11th NASA Goddard Conference on Mass Storage Systems and Technologies, 5pgs (double sided).

*Primary Examiner*—Hyung S Sough
*Assistant Examiner*—Duc T Doan
(74) *Attorney, Agent, or Firm*—Mattingly, Stanger, Malur & Brundidge, P.C.

(57) ABSTRACT

While a large amount of files can be intensively managed, the capacity scalability is limited by the number of magnetic disk drives and the number of magnetic tape drives which can be connected to a system, thereby failing to provide satisfactory long-term management for a large amount of information which increases more and more over time. A storage system of the present invention is designed for connection with a heterogeneous storage which can be controlled by the storage system, and creates file systems in a storage area reserved within the storage system and in a storage area provided by the heterogeneous storage.

5 Claims, 12 Drawing Sheets

U.S. PATENT DOCUMENTS

| | | |
|---|---|---|
| 2002/0026558 A1 | 2/2002 | Reuter et al. |
| 2002/0035667 A1* | 3/2002 | Bruning et al. ............. 711/114 |
| 2002/0087751 A1 | 7/2002 | Chong, Jr. |
| 2002/0156984 A1 | 10/2002 | Padovano |
| 2003/0061440 A1 | 3/2003 | Elliott |
| 2003/0074596 A1* | 4/2003 | Mashayekhi et al. ............ 714/4 |
| 2003/0084242 A1* | 5/2003 | Strange et al. ............... 711/114 |
| 2003/0110190 A1 | 6/2003 | Achiwa et al. |
| 2003/0115218 A1 | 6/2003 | Panagl |
| 2003/0204672 A1 | 10/2003 | Bergsten |
| 2003/0220985 A1 | 11/2003 | Kawamoto et al. |
| 2003/0236788 A1* | 12/2003 | Kanellos et al. ............. 707/100 |
| 2003/0236884 A1* | 12/2003 | Yamamoto et al. .......... 709/225 |
| 2004/0010654 A1 | 1/2004 | Yasuda et al. |
| 2004/0019655 A1 | 1/2004 | Uemura et al. |
| 2004/0111580 A1 | 6/2004 | Weber et al. |
| 2004/0193760 A1 | 9/2004 | Matsunami et al. |
| 2005/0010592 A1* | 1/2005 | Guthrie ................... 707/104.1 |
| 2005/0015460 A1* | 1/2005 | Gole et al. .................. 709/213 |
| 2005/0071546 A1 | 3/2005 | Delaney et al. |
| 2005/0114291 A1* | 5/2005 | Becker-Szendy et al. ....... 707/1 |
| 2005/0193031 A1* | 9/2005 | Midgley et al. ............. 707/200 |
| 2006/0059172 A1* | 3/2006 | Devarakonda .............. 707/100 |

FOREIGN PATENT DOCUMENTS

| | | |
|---|---|---|
| EP | 0466389 | 2/1992 |
| EP | 1209556 | 5/2002 |
| GB | 2375633 | 11/2002 |
| JP | 9-297699 | 11/1997 |
| JP | 2002 2333935 | 11/2002 |
| WO | 0077606 | 12/2000 |
| WO | 01055856 | 8/2001 |
| WO | 03017022 | 2/2003 |

* cited by examiner

FIG.11A

| Storage | SLUN | VDEV |
|---------|------|--------|
| STR1 | 0 | SVDEV0 |
| ⋮ | ⋮ | ⋮ |
| ⋮ | ⋮ | ⋮ |

FIG.11B

| VDEV | LDEV |
|--------|--------|
| SVDEV0 | SLDEV0 |
| ⋮ | ⋮ |
| ⋮ | ⋮ |

FIG.11C

| LV | LUN | LDEV | FS |
|----|-----|--------|------|
| 0 | 0 | SLDEV0 | SFS0 |
| ⋮ | ⋮ | ⋮ | ⋮ |
| ⋮ | ⋮ | ⋮ | ⋮ |

FIG.15A

JANUARY 2003          131

| LV | LUN | Storage | LDEV | WORM | Migration | FS | Remarks |
|----|-----|---------|------|------|-----------|------|---------|
| 0 | 0 | STR0 | PLDEV0 | 0 | 0 | PFS0 | home |
| 1 | 1 | STR0 | PLDEV1 | 0 | 0 | PFS1 | 2003 January |

VOLUME MANAGEMENT TABLE

FIG.15B

FEBRUARY 2003          131

| LV | LUN | Storage | LDEV | WORM | Migration | FS | Remarks |
|----|-----|---------|------|------|-----------|------|---------|
| 0 | 0 | STR0 | PLDEV0 | 0 | 0 | PFS0 | home |
| 1 | 1 | STR1 | SLDEV1 | 1 | 1 | SFS1 | 2003 January |
| 2 | 2 | STR0 | PLDEV2 | 0 | 0 | PFS2 | 2003 February |

VOLUME MANAGEMENT TABLE

FIG.15C

MARCH 2003          131

| LV | LUN | Storage | LDEV | WORM | Migration | FS | Remarks |
|----|-----|---------|------|------|-----------|------|---------|
| 0 | 0 | STR0 | PLDEV0 | 0 | 0 | PFS0 | home |
| 1 | 1 | STR1 | SLDEV1 | 1 | 1 | SFS1 | 2003 January |
| 2 | 2 | STR1 | SLDEV2 | 1 | 1 | SFS2 | 2003 February |
| 3 | 3 | STR0 | PLDEV3 | 0 | 0 | PFS3 | 2003 March |

VOLUME MANAGEMENT TABLE ly illustrating an exemplary configuration of a computing system to which the present invention is applied;

STORAGE SYSTEM WITH HETEROGENOUS STORAGE, CREATING AND COPYING THE FILE SYSTEMS, WITH THE WRITE ACCESS ATTRIBUTE

INCORPORATION BY REFERENCE

The present application claims priority from Japanese application JP2004-037596 filed on Feb. 16, 2004, the content of which is hereby incorporated by reference into this application.

BACKGROUND OF THE INVENTION

The present invention relates to a storage system for use by a computing system.

JP-A-9-297699 (pages 3-4 and FIG. 1) discloses a system referred to as a hierarchical storage system which comprises a computer, and a high speed storage and a low speed storage connected to the computer. In JP-A-9-297699 (pages 3-4 and FIG. 1), more frequently used files are stored in a high speed storage such as a magnetic disk drive, while less frequently used files are stored in an inexpensive low speed storage such as a tape drive. Then, a table is used to manage the access frequency for each file, and is referenced to determine which file is allocated to or stored in which storage.

JP-A-9-297699 relies on software running on the computer to implement a hierarchical storage control for moving a file between a small capacity magnetic disk drive and a large capacity magnetic tape drive in accordance with how frequently the file is used. The hierarchical storage control assumes that data which has been highly frequently accessed in the past will be highly frequently accessed as well in the future, and determines a storage for storing data therein in accordance with statistic information on the access frequency of the data and an available capacity of a fast accessible storage. Then, the hierarchical storage control improves the processing efficiency and practically manages a large amount of files by increasing the probability that highly frequently accessed data is stored in a fast accessible storage.

The conventional hierarchical storage technique, however, has a problem in that the capacity scalability is limited by the number of magnetic disk drives and the number of magnetic tape drives which can be connected to the computer, thereby failing to fully provide long-term management for a large amount of information which increases more and more over time.

SUMMARY OF THE INVENTION

It is therefore an object of the present invention to provide a storage system having a capacity scalability which permits a large amount of file information to be managed over a long term.

The storage system of the present invention is configured to have the ability to control input/output to/from an external storage system connected to the storage system. The storage system of the present invention builds a file system over a storage area locally provided thereby and a storage area provided by the external storage system.

The storage system can build NAS which has a capacity scalability.

Other objects, features and advantages of the invention will become apparent from the following description of the embodiments of the invention taken in conjunction with the accompanying drawings.

BRIEF DESCRIPTION OF THE DRAWINGS

FIGS. 11A to 11C show exemplary structures for a volume management table;

FIGS. 15A to 15C show exemplary structures for the volume management table.

DESCRIPTION OF THE EMBODIMENTS

In the following, embodiments of the present invention will be described with reference to the accompanying drawings. The present invention, however, is not limited to the embodiments described below.

To begin with, a first embodiment will be described.

(1) Exemplary System Configuration

Figure 1:
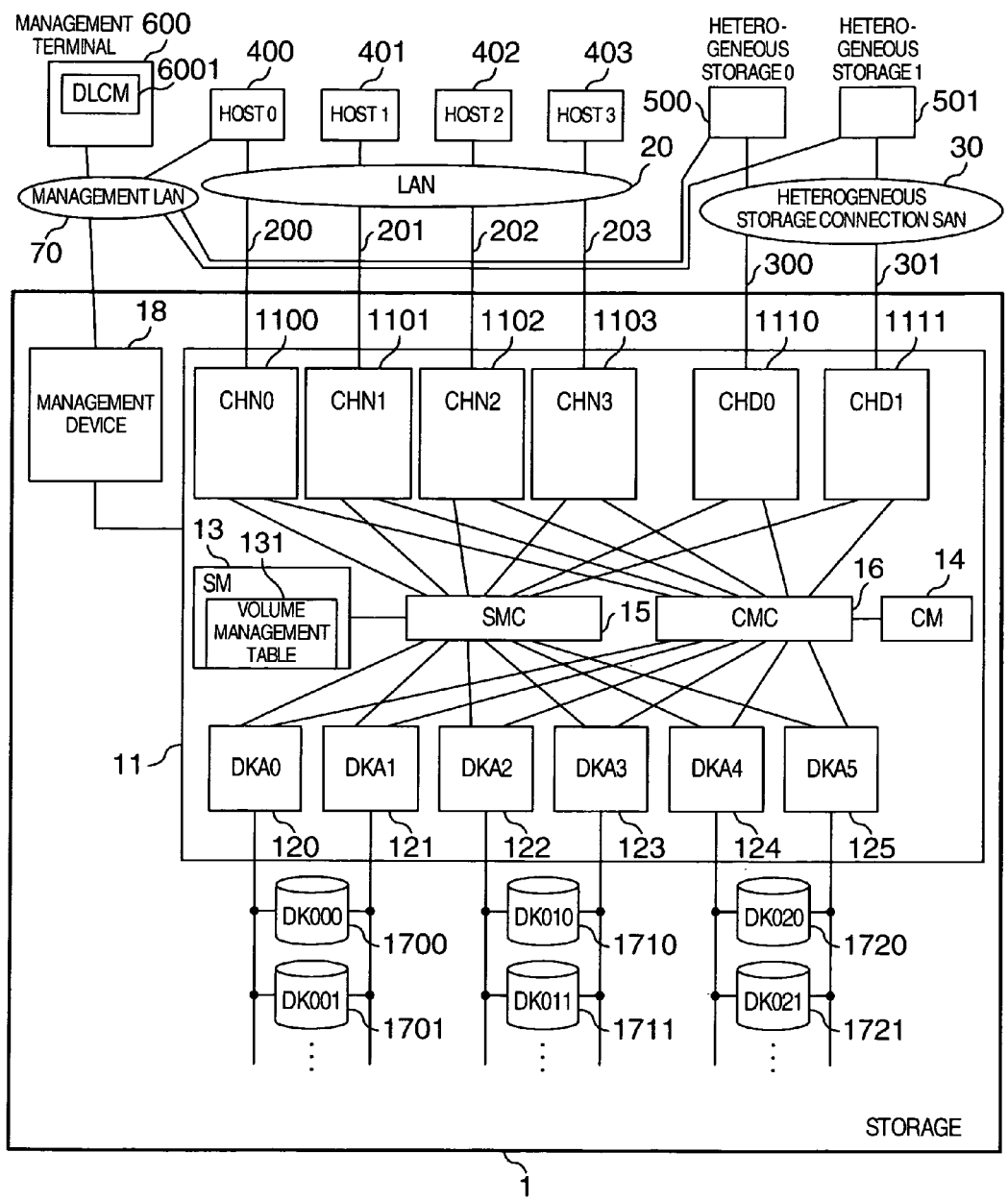
FIG. 1 is a block diagram illustrating an exemplary configuration of a computing system to which the present invention is applied.

FIG. 1 illustrates an exemplary computing system in the first embodiment. In the following description, "x" represents an arbitrary integer.

A storage 1 represents a disk array system which has a disk controller 11 (hereinafter called the "DKC 11"); a plurality of magnetic disk drives 17xx (hereinafter called the "disks 17xx"); and a management device 18. Assume in the first embodiment that each disk 17xx is an FC (Fibre Channel) disk which includes a Fibre Channel interface.

Next, the configuration of the DKC 11 in the storage 1 will be described for purposes of illustration. The DKC 11 comprises one or a plurality of NAS channel adaptors 110x (hereinafter called the "CHN 110x"); one or a plurality of heterogeneous storage connection adaptors 111x (hereinafter called the "CHD 111x"); a plurality of disk adaptors 12x (hereinafter called the "DKA 12x"); a shared memory 13 (hereinafter called the "SM 13"); a shared memory controller 15 (hereinafter called the "SMC 15"); a cache memory 14 (hereinafter called the "CM 14"); and a cache memory controller 16 (hereinafter called the "CMC 16").

Each CHN 110x is an interface controller connected to an associated computer 40x (hereinafter called the "host 40x") connected to a local area network 20 (hereinafter called the "LAN 20") through a file I/O interface.

Each CHD 111x is an interface controller connected to an associated remote storage 50x (hereinafter called the "heterogeneous storage 50x") connected to a storage area network 30 (hereinafter called the "SAN 30") through a block I/O interface. In the following description, the CHN and CHD are collectively called a "channel adaptor" (or abbreviated as "CH").

The SMC 15 is connected to the CHN 110x, CHD 11x, DKA 12x, and SM 13. The SMC 15 controls data transferred among the CHN 110x, CHD 111x, DKA 12x, and SM 13.

The CMC 16 is connected to the CHN 1100x, CHD 111X, DKA 12x, and CM 14. The CMC 16 controls data transferred among the CHN 110x, CHD 11x, DKA 12x, and CM 14.

The SM 13 has a volume management table 131. The volume management table 131 stores the configuration of a "logical device" (hereinafter called the "LDEV") for management. The LDEV constitutes a logical configuration unit of an internal storage area which comprises a series of logical sequential address spaces.

Each disk 17xx is connected to associated DKA 12x. Each DKA 12x controls input/output to/from one or a plurality of disks 17xx connected thereto.

In the storage 1, every CH can access the CM 14, SM 13, any of the DKA's 12x, and any of the disks 17x through the CMC 16 or SMC 15.

The management device 18 is connected to the DKC 11 within the storage 1 for managing the configuration of the storage 1 through each CH and each DKA. Configuration information is stored in the SM 13, and is shared by the respective CH's and DKA's.

The heterogeneous storage 50x is a storage installed external to the storage 1, and is of a type different from the storage 1. The heterogeneous storage 50x is connected to an associated CHD 11x through the SAN 30. When viewed from the heterogeneous storage 50x, the storage 1 is in position of a host computer which issues I/O. It should be noted that while the heterogeneous storage 50x is defined as a type of storage different from the storage 1 in the following description, the heterogeneous storage 50x may be of the same type as the storage 1 in an alternative embodiment.

The LAN 20 connects the CHN's 110x with the associated hosts 40x. Generally, an IP network is used for the LAN.

The SAN 30 connects the CHD's 111x with the associated heterogeneous storages 50x. Generally, Fibre Channel (FC) is used for the SAN. Alternatively, iSCSI may be used for the SAN in which case an SCSI command conforming to the SCSI protocol is encapsulated in an IP packet for communication among devices connected to the SAN through an IP network. Assume in the first embodiment that the SAN 30 is provided exclusively for connection to the heterogeneous storages 50x, and is not therefore connected to the hosts 40x.

A management terminal 600 is connected to the management device 18 included in the storage 1 through a management LAN 70. The management terminal 600 is also connected to the heterogeneous storages 50x through the management LAN 70. The management terminal 600 runs a management software application for setting and managing the storage 1 and heterogeneous storages 50x.

The storage 1 illustrated in FIG. 1 only has a NAS interface (CHN 110x) for connection with the hosts 40x through the LAN 20. The computing system in the first embodiment may additionally comprise a SAN interface (SAN channel adaptor) for connecting the storage 1 to the hosts 40x through the SAN 30, such that either the NAS interface or the SAN interface can be selected.

(2) Exemplary Appearance of Storage

Figure 2:
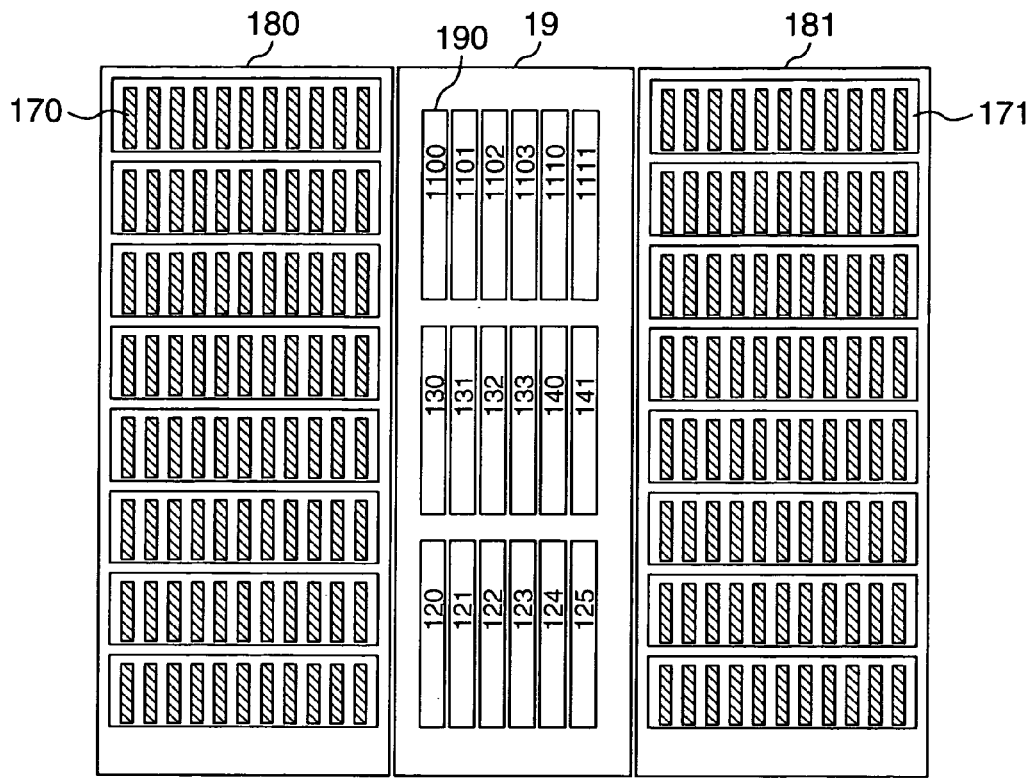
FIG. 2 is a plan view illustrating an appearance of an exemplary storage.

FIG. 2 illustrates an exemplary appearance of the storage 1.

A DKC unit 19 stores the CHN's 110x, CHD's 11x, DKA's 12x, SM 13, and CM 14 which are components of the DKC 11. The SM 13 is actually comprised of a plurality of controller boards 13x. Likewise, the CM 14 is comprised of a plurality of cache boards 14x. The user of the storage 1 can increase or decrease the number of these boards to tailor the storage 1 that has a desired storage capacity of the CM 14 or SM 13. A disk unit (hereinafter called the "DKU") 180 and DKU 181 store a plurality of disks 17xx.

Each of slots 190 receives an adaptor board which contains the CHN's 110x, CHD's 111x, DKA's 12x, controller boards 13x, cache boards 14x, and the like. In the first embodiment, the shape of the slot 190, the size of the adaptor board, and the shape of a connector are consistent irrespective of the type of adaptor board and the type of interface, so that the compatibility is ensured. Consequently, an arbitrary adaptor board can be plugged into an arbitrary slot 190 of the DKC unit 19 irrespective of the type of adaptor board or the type of interface. Also, the user of the storage 1 can freely select the number of adaptor boards for the CHN's 110x and CHD's 111x to plug the selected number of CHN's 110x and CHD 111x into slots 190 of the DKC unit 19.

(3) Exemplary Appearance of CHN Board

Figure 3:
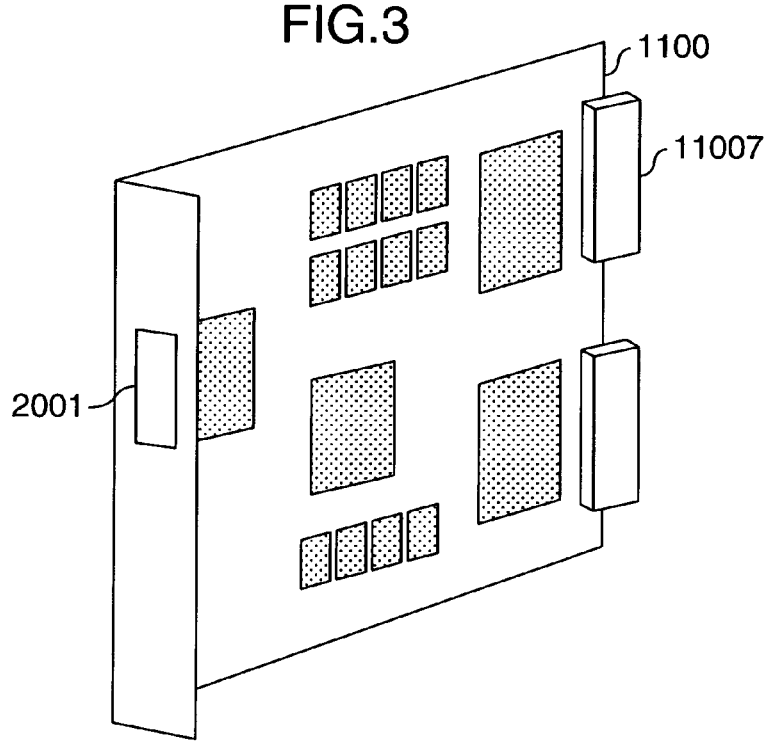
FIG. 3 is a perspective view illustrating an appearance of an exemplary adaptor board.

FIG. 3 illustrates an exemplary appearance of the adaptor board (hereinafter called the "CHN board") which contains the CHN 110x. A connector 11007 is connected to a connector of the DKC unit 19. An interface connector 2001 can be connected to the LAN 20.

In the first embodiment, since the connector of the adaptor board is consistent in shape irrespective of the type of adaptor board, the CHN board has a connector in the same shape as an adaptor board (hereinafter called the "CHD board") which contains the CHD 111x. It should be noted that the interface connector 2201 of the CHD board supports the fibre channel, and is designed for connection with the fibre channel.

(4) Exemplary Configuration of NAS Channel Adaptor (CHN)

Figure 4:
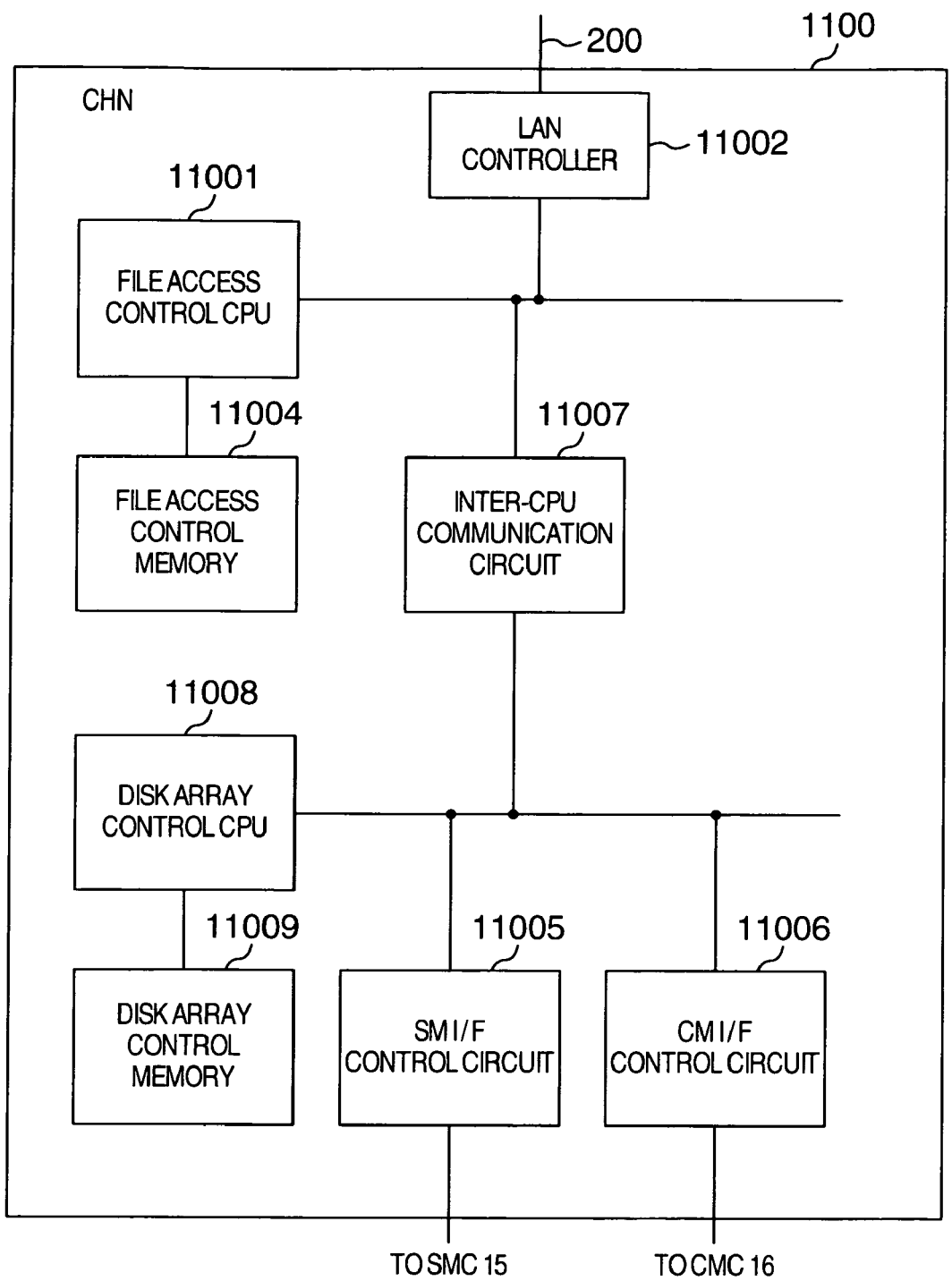
FIG. 4 is a block diagram illustrating an exemplary configuration of a NAS channel adaptor.

FIG. 4 illustrates an exemplary configuration of the CHN 110x. A file access control CPU 11001 is a processor for controlling accesses to files. A LAN controller 11002 is connected to the LAN 20 through the interface connector 2001 for controlling transmission/reception of data to/from the LAN 20. A file access control memory 11004 is connected to the file access control CPU 11001. The file access control memory 11004 stores programs executed by the file access control CPU 11001, and associated control data.

A disk array control CPU 11008 is a processor for controlling a disk array. The disk array used herein has groups, each of which is composed of a plurality of disks 17xx and is handled as a single virtual disk, and operates the plurality of disks 17xx in parallel to improve the performance. Particularly, a so-called RAID (Redundant Arrays of Inexpensive Disks) is a disk array which stores redundant data called "parities" in part of a storage area of a group to increase the fault tolerance. Among disk arrays, the RAID is particularly frequently used.

A disk array control memory 11009, which is connected to the disk array control CPU 11008, stores programs executed by the disk array control CPU 11009, and associated control data. An SM I/F control circuit 11005 controls an access from the CHN 110*x* to the SM 13. A CM I/F control circuit 11006 controls an access from the CHN 110*x* to the CM 14. An inter-CPU communication circuit 11007 is used when the file access control CPU 11001 communicates with the disk array control CPU 11008 for accessing a disk.

While the first embodiment illustrates an example of an asymmetric multi-processor configuration in which the CHN 110*x* is mounted with two processors, i.e., the file access control CPU 11001 and disk array control CPU 11008, the CHN may be mounted with a single processor which executes both of the file access control and disk array control. Further alternatively, the CHN 110*x* may be designed in a symmetric multi-processor configuration which employs two or more processors that evenly execute one or both of the file access control and disk array control.

(5) Exemplary Configuration of File Access Control Memory

Figure 5:
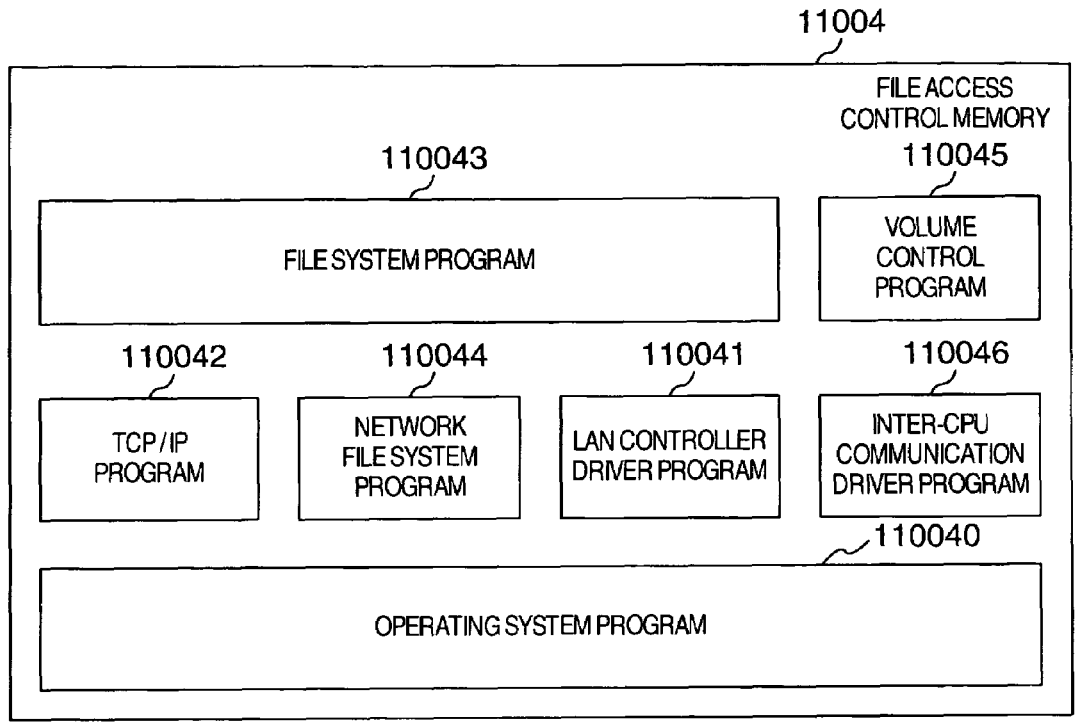
FIG. 5 is a block diagram illustrating exemplary programs stored in a file system control memory.

FIG. 5 illustrates, by way of example, programs and associated control data stored in the file access control memory 11004 included in the CHN 110*x*. An operating system program 110040 is used to manage whichever programs associated therewith and control input/output operations. A LAN controller driver program 110041 is used to control the LAN controller 11002. A TCP/IP program 110042 is used to control TCP/IP which is a communication protocol on the LAN. A network file system program 110044 is used to control NFS, CIFS, and the like which are protocols for providing the NAS host 40*x* with files stored in the storage. A volume control program 110045 is used to control a logical volume comprised of one or a plurality of logical units (hereinafter called the "LU"). An inter-CPU communication driver program 110046 is used to control the inter-CPU control circuit 11007 for communicating between the file access control CPU 11001 and disk array control CPU 11008.

A file system program 110043 is used to manage files stored in the storage, and executes file storage management and input/output control. Specifically, the file system program 110043 is involved in control processing including:

1) opening a file when it is to be used;
2) responding to a file access request received from a host to execute disk input/output operations in accordance with the access request;
3) determining an area on a disk in which a file is stored for management; and
4) managing a correspondence relationship between the name of an opened file and a table which manages a file storage area and a buffer address of the file.

(6) Exemplary Configuration of Disk Array Control Memory

Figure 6:
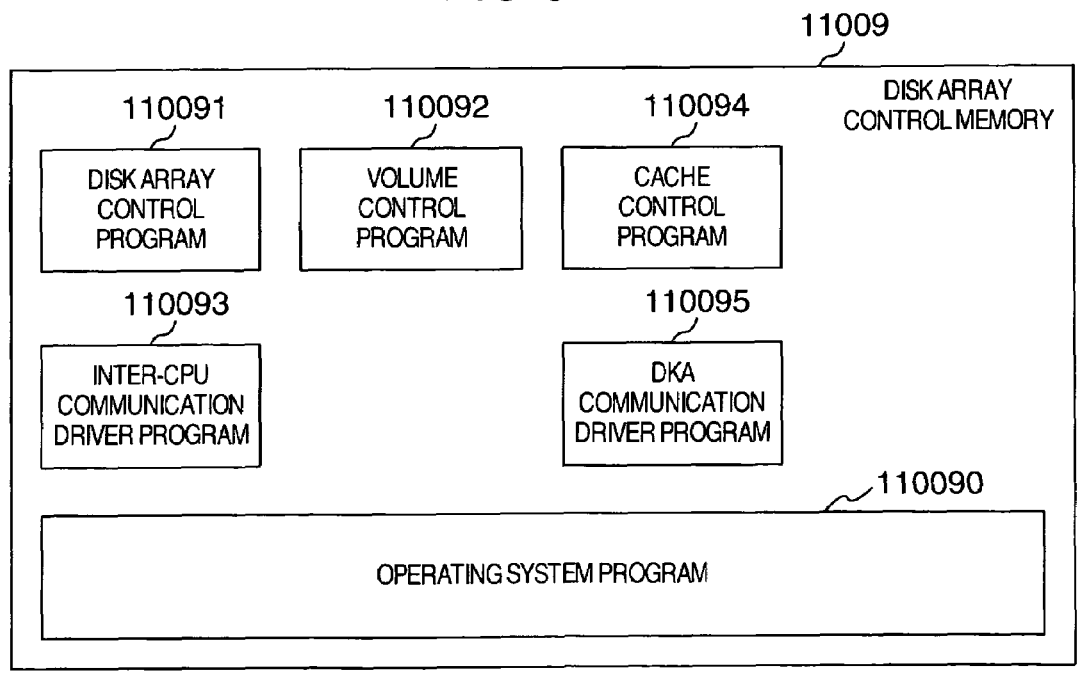
FIG. 6 is a block diagram illustrating exemplary programs stored in a disk array control memory.

FIG. 6 illustrates, by way of example, programs and associated control data stored in the disk array control memory 11009 included in the CHN 110*x*.

An operating system program 110090 is used to manage whichever programs associated therewith and control input/output operations.

A driver program used for a CPU to communicate with another CPU (hereinafter called an inter-CPU communication driver program) 110093 is used to control the inter-CPU communication circuit 11007 for communicating between the file access control CPU 11001 and disk array control CPU 11008, and receives an access request for the LU from the file access control CPU 11001.

A volume control program 110092 creates one or a plurality of logical devices (hereinafter called the "LDEV"), each of which is a logical configuration unit of a storage area comprising a pair of logical sequential address spaces, on a RAID group (hereinafter called the "VDEV") comprised of a plurality of disks 17*xx* to form a RAID, couples one or a plurality of LDEV's to create a logical unit (hereinafter called the "LU"), and manages relation information associated with the logical devices and logical unit.

A cache control program 110094 is used for management of data stored in the CM 14, and for control such as determination of cache hit/miss.

A DKA communication driver program 110095 is used to communicate with the DKA 12*x* when a disk 17*xx* must be accessed.

A disk array control program 110091 is involved in a sequence of disk array control operations. Specifically, from an access request from the file access control CPU 11001 to the LU received through the inter-CPU communication driver program 110093, the disk array control program 110091 identifies an LDEV and a VDEV corresponding to the LU accessed by the file access control CPU 11001 with the aid of the volume control program 110092, determines cache miss or hit associated with the access with the aid of the cache control program 110094, and issues an access request to the DKA 12*x* with the aid of the DKA communication driver program 110095 when an access to a disk is required.

(7) Exemplary Configuration of Heterogeneous Storage Connection Adaptor (CHD)

Figure 7:
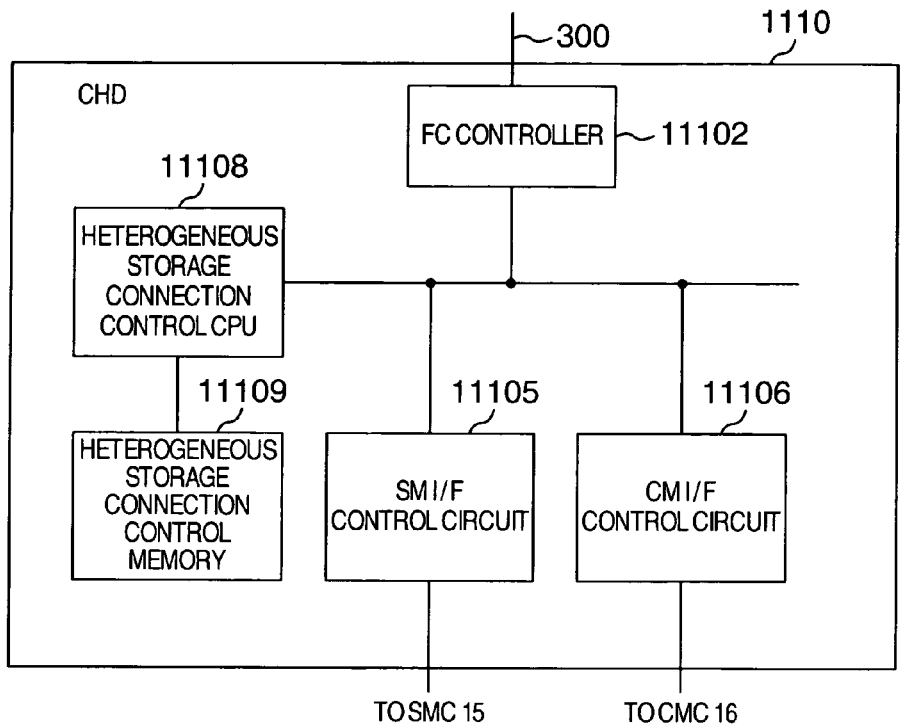
FIG. 7 is a block diagram illustrating an exemplary configuration of a heterogeneous storage connection control channel adaptor.

FIG. 7 illustrates an exemplary configuration of the CHD 111*x*.

A heterogeneous storage connection control CPU 11108 is a processor for controlling a connection to a heterogeneous storage 50*x*.

A heterogeneous storage connection control memory 11109, which is connected to the heterogeneous storage connection control CPU 11108, stores programs executed by the heterogeneous storage connection CPU 11108, and associated control data. An SM I/F control circuit 11105 controls an access from the CHD 110*x* to the SM 13. A CM I/F control circuit 11106 controls an access from the CHD 110*x* to the CM 14.

(8) Exemplary Configuration of Heterogeneous Storage Connection Control Memory

Figure 8:
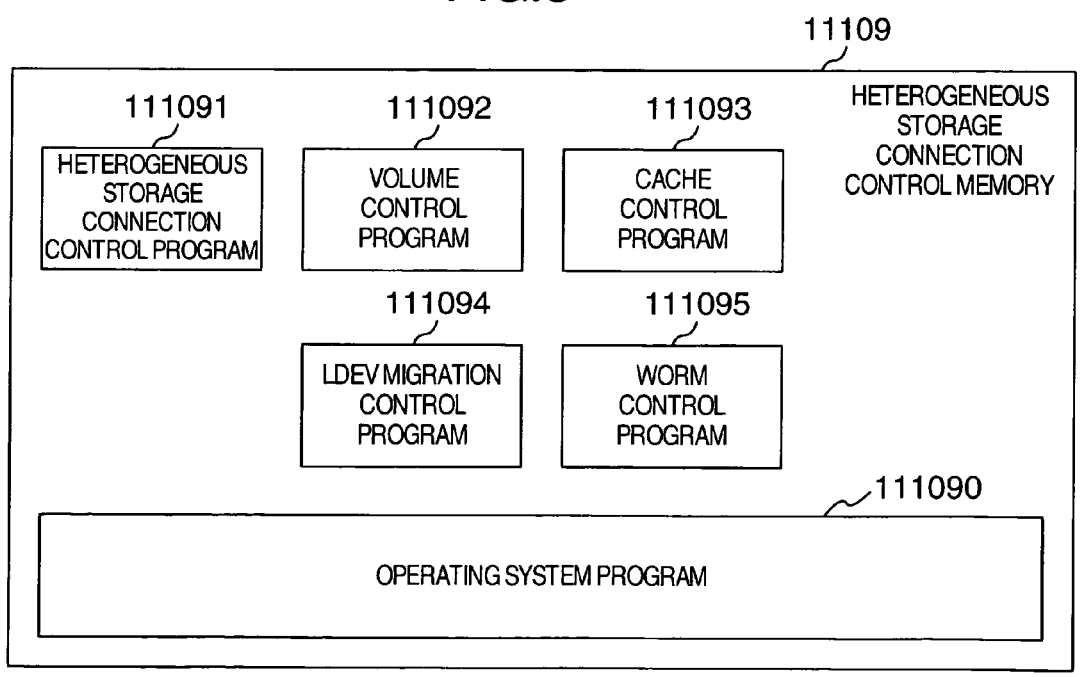
FIG. 8 is a block diagram illustrating exemplary programs stored in a heterogeneous storage connection control memory.

FIG. 8 illustrates, by way of example, programs and associated control data stored in the heterogeneous storage connection control memory 11109 included in the CHD 111*x*.

An operating system program 111090 is used to manage whichever programs associated therewith and control input/output operations.

A heterogeneous storage connection control program 111091 recognizes a heterogeneous storage 50*x* connected to the SAN 30, confirms the capacity of an LU provided by the heterogeneous storage 50*x*, and reads from and writes into the LU.

A volume control program 111092 regards an LU provided by the heterogeneous storage 50*x* as one of VDEV's contained in the storage 1 for management. Since this LU is handled as a VDEV within the storage 1, an LDEV is created on the VDEV. When the volume control program 111092 manages an LU in the heterogeneous storage 50*x* as a VDEV, this VDEV is corresponded to the LDEV by the volume control program 110092 of the CHN 110*x*, and the LDEV in turn is corresponded to the LU.

It should be noted that the LU in the heterogeneous storage 50*x* is handled as a VDEV, but when the heterogeneous storage unit 50*x* is a RAID disk array device, no redundant data need be added to the storage 1 because the heterogeneous storage 50*x* comprises a RAID within itself.

A cache control program 111093 is used for management of data stored in the CM 14 and for control such as determination of cache hit/miss.

An LDEV migration control program 111094 is involved in a migration of the LDEV.

When the data stored in an LDEV managed by the storage 1 is copied to an LDEV created on the heterogeneous storage 50x and the original data is erased, the LDEV appears as if it has moved to the heterogeneous storage 50x. This sequence of operations is called the "LDEV migration." The LDEV migration control program 111094 executes an LDEV migration between the storage 1 and heterogeneous storage 50x; an LDEV migration within the heterogeneous storage 50x; and an LDEV migration between one heterogeneous storage 50x and another heterogeneous storage 50x.

A WORM control program 111095 adds a WORM (Write Once Read Many) attribute to a LDEV created in a heterogeneous storage 50x managed by the CHD 1110. An example of WORM control may involve aborting all write operations other than a write operation associated with a migration of an LDEV, and handling this LDEV as a read only LDEV to give the WORM attribute to the LDEV. Otherwise, the WORM control may permit a write-once operation to an LDEV to give the LDEV the WORM attribute. The following description will be made on the assumption that all write operations are aborted except for a write operation associated with a migration of an LDEV, and the LDEV is handled as a read only LDEV.

(9) Exemplary Configuration of Heterogeneous Storage

Figure 9:
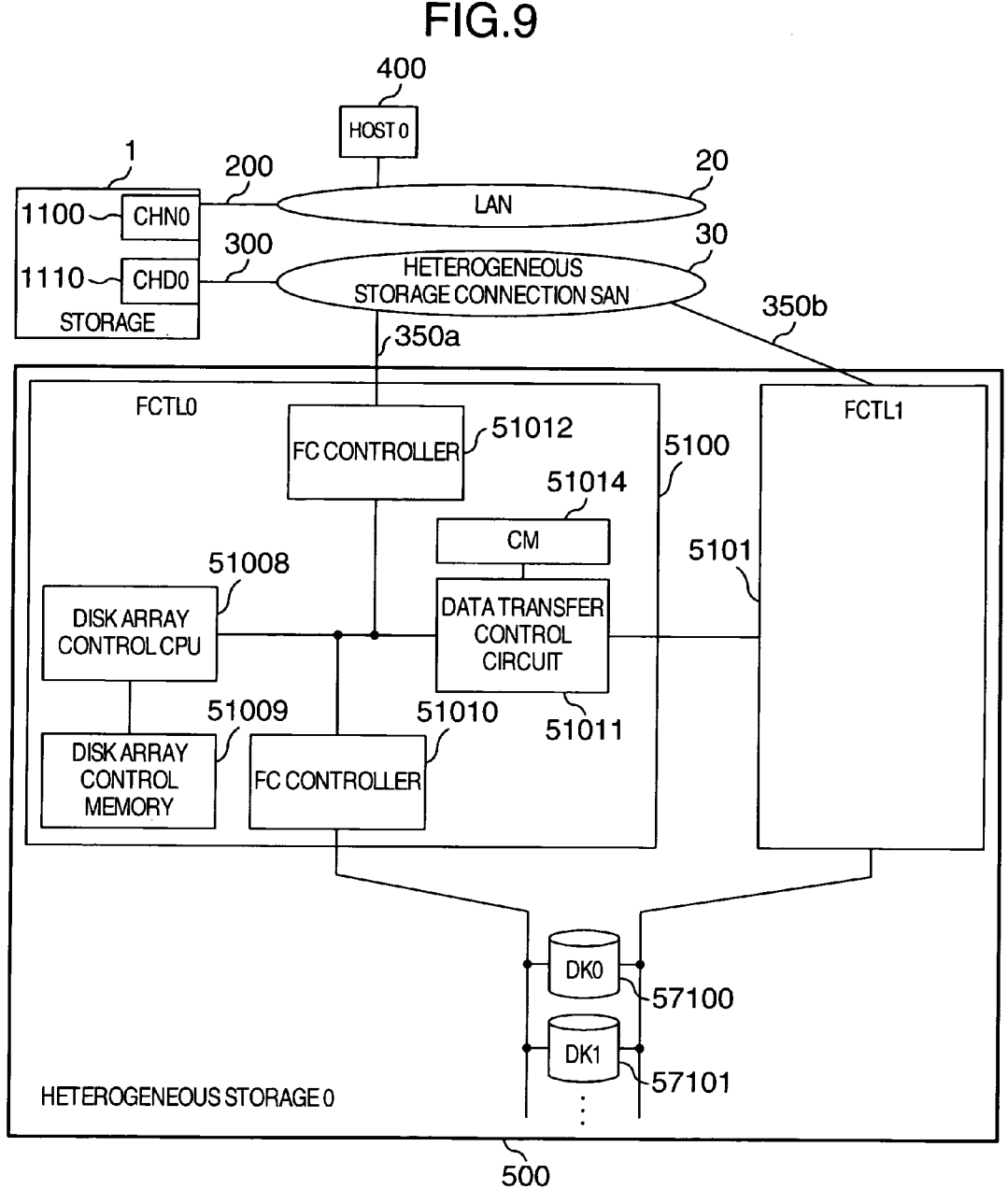
FIG. 9 is a block diagram illustrating an exemplary configuration of a heterogeneous storage.

FIG. 9 illustrates an exemplary configuration of the heterogeneous storage 50x. The heterogeneous storage 50x comprises a pair of disk array controllers FCTLx510x for providing fault tolerance, such that when one FCTL becomes inoperative due to a fault, the other is substituted for the faulty one to take over.

Each of the disk array controllers FCTLx510x comprises an FC controller 51012, a disk array control CPU 51008, a disk array control memory 51009, a cache memory 510144, a data transfer control circuit 51011, and an FC controller 51010. The FC controller 51012 connects the FCTLx510x to the SAN 30.

The disk array control CPU 51008 is a processor for controlling a disk array. The disk array control memory 51009 stores a disk array control program and associated control data. The FC controller 51010 connects and controls the disks 5710x. The data transfer control circuit 51011 is disposed among the FC controller 51012, CM 51014, and FC controller 51010 for controlling data input/output to/from the CM 51014, and a data transfer to the other FCTL.

Like the storage 1, the heterogeneous storage 50x forms a plurality of disks 5710x into a RAID group, and creates one or a plurality of LU's, each of which is allocated a sequence of addresses in part or all of its storage area.

In FIG. 9, CHD0 (1110) of the storage 1 is connected to a heterogeneous storage 0(500) through a heterogeneous storage connection SAN 30, and operates as if it were a host, when viewed from the heterogeneous storage 0(500). The CHD0 (1110) acts as a host of the heterogeneous storage 0(500) to issue access commands such as a read and a write for controlling the heterogeneous storage 0(500).

(10) Exemplary Configuration: Single Heterogeneous Storage Connected to Heterogeneous Storage Connection SAN In the following, the operation of the storage system according to the first embodiment will be described with reference to the configurations described above.

Figure 10:
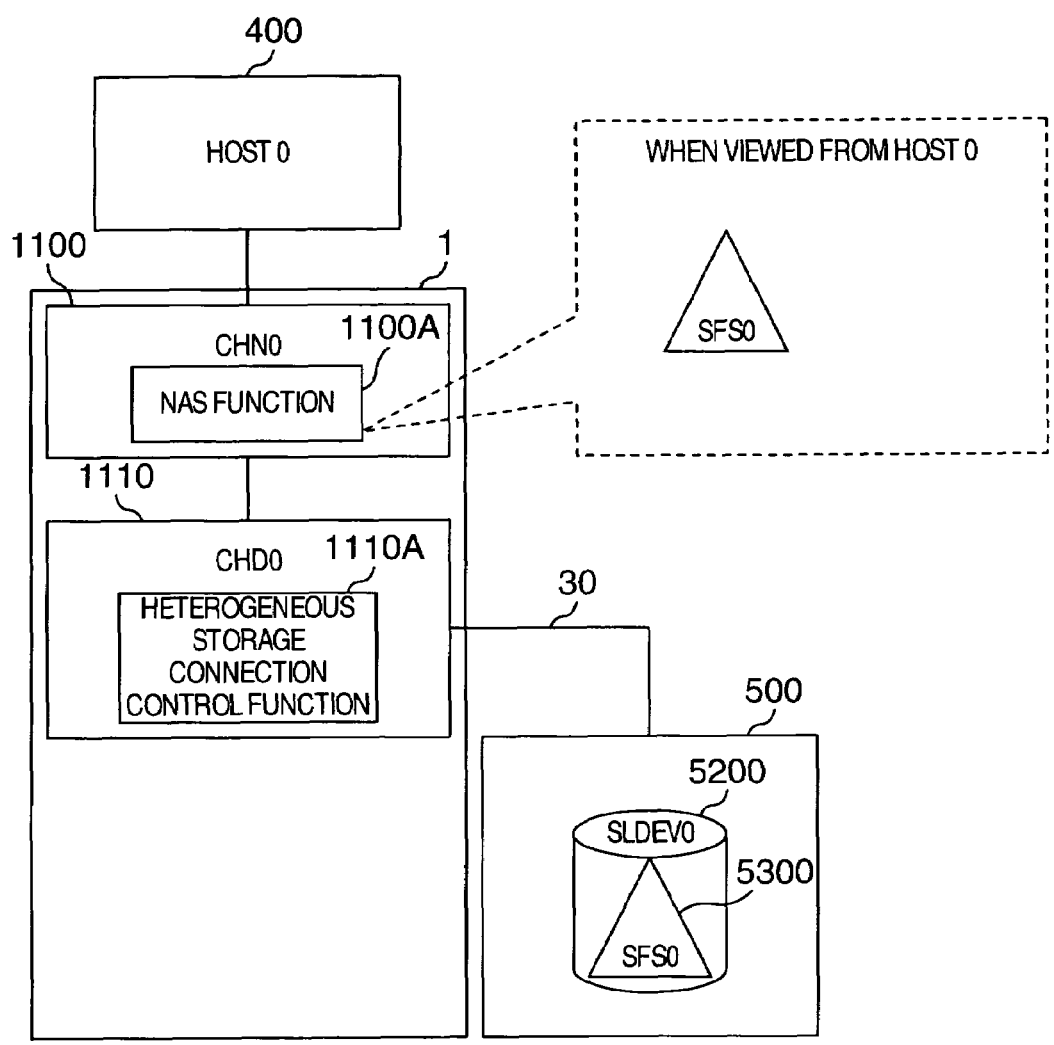
FIG. 10 is a block diagram illustrating an exemplary configuration in which one heterogeneous storage is connected to each storage.

FIG. 10 illustrates in a simplified form an exemplary configuration of a computing system for highlighting features of the system while omitting the detailed configurations described above.

FIGS. 11A-11C show exemplary states of the volume management table 131 corresponding to FIG. 10.

The volume management table 131 shown in FIG. 11A represents an exemplary relationship between LU's created in the heterogeneous storage 500 and VDEV's made up of LU's created in the heterogeneous storage 500. In the volume management table 131 shown in FIG. 11A, "SLUN" indicates an identification number of the LU created and used in the heterogeneous storage 500, i.e., an identification number used by the disk array controller FCTLx510x in the heterogeneous storage 500 for accessing the LU. "VDEV" indicates a VDEV corresponding to a LU created in the heterogeneous storage 500.

The volume management table 131 shown in FIG. 11B represents an exemplary relationship between the VDEV shown in FIG. 11A and LDEV. In the volume management table 131 shown in FIG. 11B, "LDEV" indicates an LDEV corresponding to the VDEV.

The volume management table 131 shown in FIG. 11C represents an exemplary relationship among the LDEV shown in FIG. 1B, LUN, LV, and FS. In the volume management table 131 shown in FIG. 11C, "LUN" indicates the number of an LU corresponding to an LDEV; "LV" indicates a number corresponding to the LU; and "FS" indicates an FS corresponding to the LV.

In the first embodiment, the volume management table 131 contains information on the FS for management, however, the FS may be managed by a separate management table, so that the management of the FS is not limited to the particular manner employed in this embodiment.

In the storage 1 of FIG. 10, the configuration of the CHN 1110 illustrated in FIG. 4 is generally called a "NAS function 1100A." Also, the configuration of the CHD 1110 illustrated in FIG. 7 is generally called a "heterogeneous storage connection control function 1110A."

The operation of the first embodiment will be described in connection with an example in which a logical device 5200 (SLDEV0) is created on a LU with SLUN=0 in the heterogeneous storage 500, and a file system 5300 (SFS0) is created on the logical device SLDEV0.

Assume that the heterogeneous storage 500 has created the LU with SLUN=0 through the disk array controller FCTLx510x of the heterogeneous storage 500.

Referring first to FIG. 8, description will be made on the operation of the heterogeneous storage connection control function 1110A of the CHD0 (1110). A heterogeneous storage connection control program 111091 issues an inquiry command to the heterogenous storage 500 to detect LU0 in the heterogeneous storage 500. A volume control program 111092 regards this LU0 as SVDEV0, and registers the same in the volume management table 131 of the SM 13. Specifically, the volume control program 111092 registers "0" in the SLUN entry and SVDEV0 in the VDEV entry in the volume management table 131 shown in FIG. 11A.

Referring next to FIG. 6, description will be made on the operation of the NAS function 1100A of the CHN0 (1100). The volume control program 110092 executed by the disk array control CPU 11008 in FIG. 6 references the volume management table 131 shown in FIG. 11A, stored in the SM 13, to detect the SVDEV0. The volume control program 110092 creates SLDEV0 of a proper size for this SVDEV0, and registers the created SLDEV0 in the volume management table 131 shown in FIG. 11B stored in the SM 13. Specifically, the volume control program 110092 registers SVDEV0 in the VDEV entry, and the SLDEV0 corresponding to the SVDEV0 in the LDEV entry of the volume management table 131 shown in FIG. 11B.

The manager issues an instruction from the management terminal 18 to the computing system for creating an LU having a desired capacity, and upon receipt of the instruction, the storage 1 creates the LU comprised of one or a plurality of LDEV's. Assume herein that one LU0 is created with one SLDEV0. In other words, the volume control program 110092 registers SLDEV0 in the LDEV entry and the number "0" of the LU0 corresponding to SLDEV0 in the LUN entry of the volume control program 110092.

Next, as the host 40x activates the storage 1, the volume control program 110045 in FIG. 5 executed by the file access control CPU 11001 in the storage 1 issues an inquiry command to the disk array control CPU 11008 using the inter-CPU communication driver program 110046 to make a query to the disk array control CPU 11008 for detecting the LU0. The volume control program 110092 executed by the disk array control CPU 11008 detects the LU0, and notifies the file access control CPU 11001 of the detection. The volume control program 110045 recognizes this LU0, and creates a logical volume LU0 using the LU0. While a logical volume can be created by coupling a plurality of LU's, assume herein that the LV0 is created with the single LU0. In other words, the volume control program 110045 registers LV0 corresponding to the LU0 in the LV entry of the volume management table 131 shown in FIG. 1C.

In response to an instruction from the manager, the file system program 110043 creates a file system SFS0 on the logical volume LV0. In other words, the file system program 110043 registers SFS0 corresponding to the LV0 in the FS entry of the volume management table 131 shown in FIG. 1C.

With the foregoing operations, the LV0 in the storage 1 is created from the LU0 of the storage 1, while the LU0 is created from the SLDEV0 in the first embodiment. The SLDEV0 in turn includes the storage area SVDEV0 implemented by the LU in the heterogeneous storage system. As a result, the logical device SLDEV0 controlled by the CHN0 (1100) is established on the heterogeneous storage 500, and the file system SFS0 controlled by the CHN0 (1100) is established on the SLDEV0.

As the host 0(400) issues a query to the file system, the LAN control driver program 110041 illustrated in FIG. 5 controls the LAn controller 11002 to receive a packet including this query from the LAN 20, and the file system program 110043 recognizes this query by the action of the TCP/IP program 110042 and network file system program 110044. Then, the file system program 110043 transmits directory information on the SFS0 to the host 0(400) which then recognizes that this file system is the SFS0 resident in the storage 1, as illustrated in FIG. 10. Subsequently, the file system can come into use. Here, the directory information on the file system SFS0 is general directory information, so that this directory information is not described in detail in the present disclosure.

In the first embodiment, the disks 17xx contained in the storage 1 are not at all required, while information for managing the file system SFS0 created by the NAS function 1100A is stored in the SLDEV0 established on the LU in the heterogeneous storage 50 through the heterogeneous storage connection SAN 30 by the action of the heterogeneous storage connection control function 111A of the CHD0. Here, the information for managing the file system SFS0 is general file system management information commonly referred to as metadata, so that detailed description will not be made on its structure in the present disclosure.

As described above, according to the configuration illustrated in FIG. 10, the NAS function 1100A of the storage 1 can create a file system on disks contained in the heterogeneous storage 500 connected to the storage 1 through the heterogeneous storage connection control function 1110A. This function will be hereinafter called the "heterogeneous storage connection NAS function."

When the host 0(400) is to access a file stored in the file system FS0, the host 0(400) sends an access request to the CHN0 (1100) for specifying a file system name and a file name. Upon receipt of the access request including the file system name and file name, the CHN0 (1100) references the volume management table 131 to determine the location at which the associated file is stored. When the file is stored in a heterogeneous storage, the CHN0 (1100) informs the CHD0 (1110) that an access is requested for data stored in the heterogeneous storage, and simultaneously notifies the CHD0 (1110) of the data storage location retrieved from the volume management table 131, thus permitting the CHD0 (1110) to access data in the heterogeneous storage. Also, the CHN0 (1100) may store information on an access request from the host to data in the heterogeneous storage in the SM 13, such that the CHD0 (1110) periodically checks the SM 13 for information on an access request from the host to data in the heterogeneous storage. Upon recognition of an access request, the CHD0 (1110) may reference the volume management table 131 to access data in the heterogeneous storage. When the CHD0 (1110) accesses the heterogeneous storage 500, the CHD0 (1110) is required to use addresses which can be recognized by the disk array controller FCTLx510x of the heterogeneous storage 500. Thus, the CHD0 (1110) accesses the heterogeneous storage 500 using the SLUN (in the volume management table 131 in FIG. 11A) corresponding to the VDEV which stores the data.

(11) Exemplary Configuration: Plurality of Heterogeneous Storages Connected to Heterogeneous Storage Connection SAN Next described will be made on an exemplary configuration in which a plurality of heterogeneous storages are connected to the heterogeneous storage connection SAN.

Figure 12:
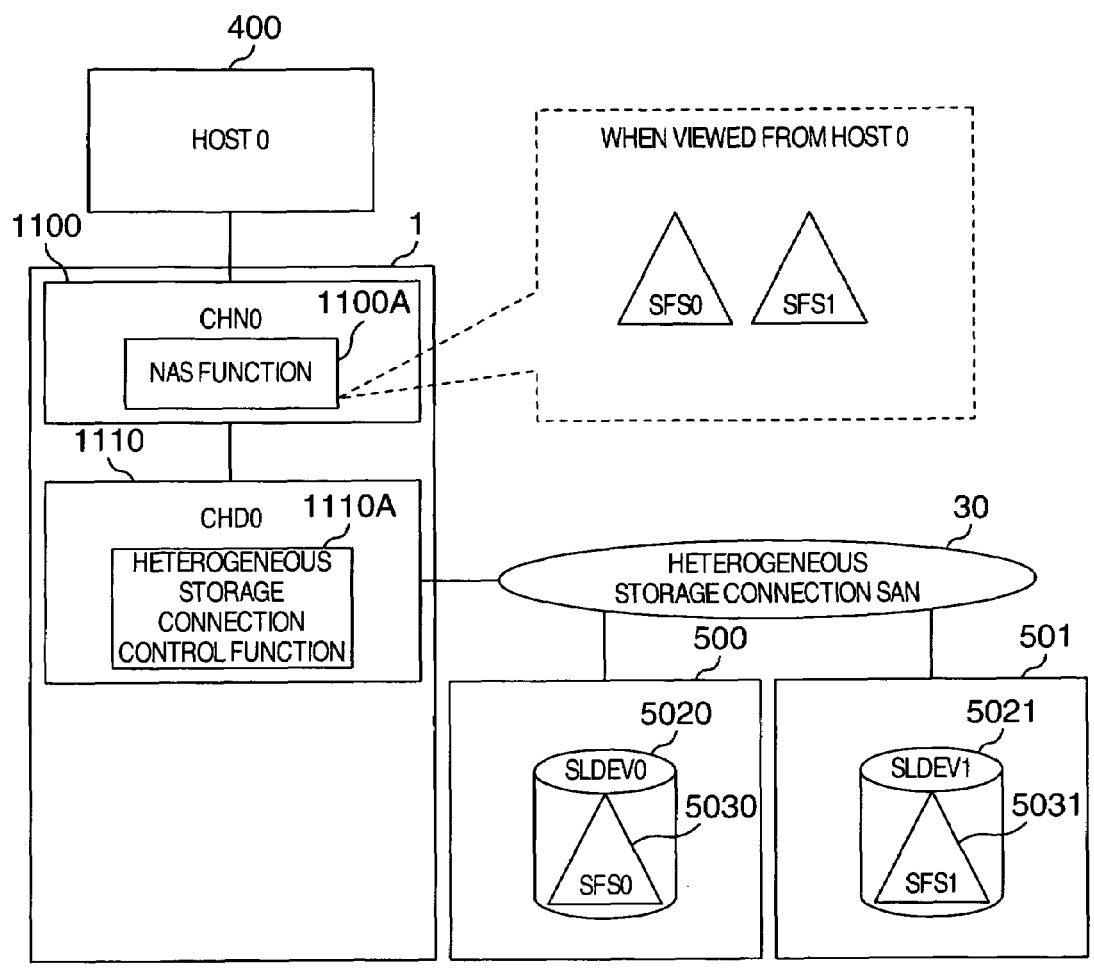
FIG. 12 is a block diagram illustrating an exemplary configuration in which a plurality of heterogeneous storages are connected to each storage.

FIG. 12 illustrates an exemplary configuration in which a plurality of heterogeneous storages are connected to the heterogeneous storage connection SAN. The configuration in FIG. 12 differs from the configuration in FIG. 10 in that a plurality of (two in FIG. 12) heterogenous storages 500, 501 are connected to the heterogeneous storage connection SAN 30.

Operations similar to those performed in the configuration of FIG. 10 are duplicated for the heterogenous storages 500, 501 to create a file system SFS0 on the SLDEV0 in the heterogeneous storage 500, and a file system SFS1 on SLDEV1 in the heterogeneous storage 501. The file systems SFS0 and SFF1 are both recognized by the host 0(400) by the action of the NAS function 1100A of the CHN0.

In this way, by connecting an increased number of heterogeneous storages 50x to the heterogeneous storage connection SAN 30, it is possible to increase the storage capacity which can be handled by the CHN0.

As described above, according to the configuration in FIG. 12, an arbitrary number of heterogeneous storages can be connected to the heterogeneous storage connection SAN 30 of the storage 1, thereby making it possible to build a large scaled NAS which has a capacity scalability.

As will be appreciated from the foregoing, according to the first embodiment, the ability to implement the heterogeneous storage connection NAS function and to increase the storage capacity by adding external storages can realize a large scaled NAS which excels in the capacity scalability and can store a large capacity of file data.

Also, the host can access a file system in an external storage system through a storage system for controlling input/output operations to/from external storages connected thereto, without the need for being conscious of the file system which has been established in a storage area of the external storage system.

Next, a second embodiment will be described. The second embodiment applies the heterogeneous storage connection NAS function discussed in connection with the first embodiment.

Figure 13:
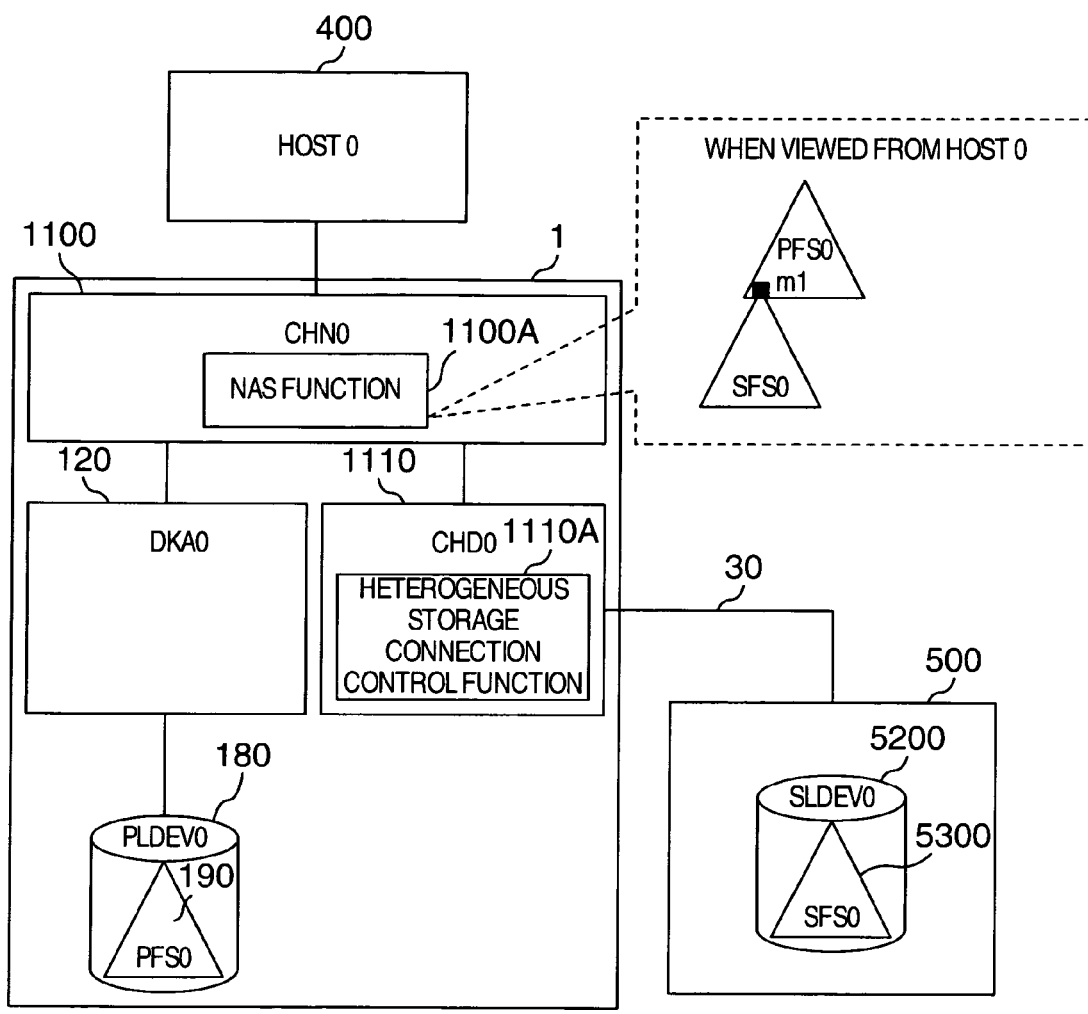
FIG. 13 is a block diagram illustrating an exemplary configuration for utilizing a mixture of storages and heterogeneous storages.

FIG. 13 illustrates a first exemplary application. FIG. 13 differs from FIG. 10 in that the CHN0 of the storage 1 creates the logical device SLDEV0 on the heterogeneous storage 500, with the file system SFS0 being created on the logical device SLDEV0, and that a logical device PLDEV0 (180) is created on a disk 17xx of the storage 1, with a file system PFS0 (190) being created on the logical device PLDEV (180).

Another difference lies in that a root directory is mounted at a mount point m1 of the PFS0. The CHN0 has recognized that the root of the SFS0 has been mounted at the mount point m1 of the PFS0. The host 0(400) recognizes the two file systems PFS0 and SFS0 as a single file system PFS0 which is configured in the form of a single directory tree.

Assume herein that a method of coupling the SFS0 as part of the PFS0 so that they appear as if they made up a single directory tree is represented herein by "mount." As an example, by soft-linking (symbolic-linking) the root of the SFS0 from the mount point m1 of the PFS0, the SFS0 can be coupled to the PFS0. Another method may create a file system such that the root of the SFS0 is mapped to the mount point m1.

The CHN0 can mount the SFS0 at the mount point m1 of the PFS0 by a similar method of mounting another FS created on another FDEV in the storage 1 in a file system created in a VDEV in the storage 1. This is because the CHN0 handles the VDEV in the storage 1 and the VDEV created on the LU in the heterogeneous storage 500 as the same VDEV, and creates LDEV, LV, FS on the VDEV.

In this way, in the second embodiment, a file system PFSx created on a logical device PLDEVx within the storage 1 is combined with a file system SFSx created on a logical device SLDEVx defined in the heterogeneous storage 500 to build a file system PFSx which comprises a single directory tree that has a capacity too large to be built only with the internal disk capacity. With this configuration, the host can use a large scaled file system with a transparent single view without being conscious of whether a file system resides in the storage 1 or in the heterogeneous storage 500.

Also, the host 0(400) specifies a file system name PFS0 and a file name when it issues an access request for a file stored in the PFS0 or in the SFS0 mounted in the PFS0. Upon receipt of the access request from the host 0(400), the CHN0 confirms whether an associated file is stored in the PFS0 or SFS0, and subsequently accesses data in the file stored in the heterogeneous storage system in a similar way to the first embodiment if the file is stored in the SFS0.

Next, a third embodiment will be described.

Figure 14:
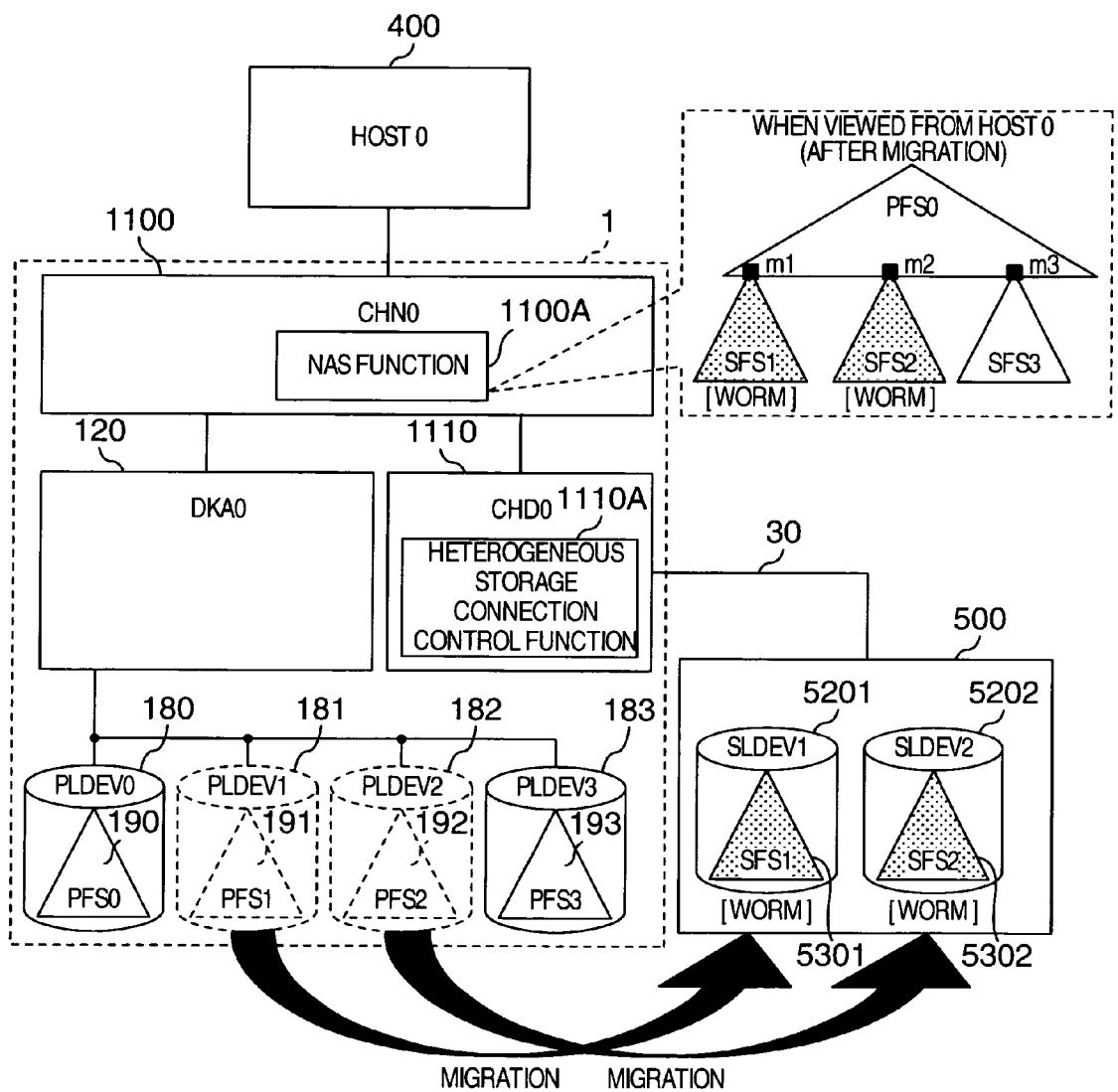
FIG. 14 is a block diagram illustrating another exemplary configuration for utilizing a mixture of storages and heterogeneous storages.

FIG. 14 illustrates a second exemplary application of the first embodiment. While FIG. 14 is basically the same as FIG. 13, an increased number of PLDEV's and SLDEV's are provided in the embodiment illustrated in FIG. 14.

Assuming that the operation of data started in January 2003, PLDEV0, PLDEV1 have been initially established in the storage 1, and file systems PFS0, PFS1 have been created on the respective logical devices. The PFS0 is defined as a home file system, and the PFS1 is mounted at a mount point m1 to create a single view file system PFS0, thereby providing the host 0(400) with a file service.

FIG. 15A shows an exemplary state of the volume management table 131 at the time of January 2003. In the volume management table 131, "LV" indicates a logical volume recognized by the CHN0. "LUN" indicates the number of a LU recognized by the CHN0. "Storage" indicates a storage which stores the LU, where STR0 represents the storage 1, and STR1 represents the heterogeneous storage 500. "LDEV" indicates an LDEV on which the LU has been established in the storage 1. In the third embodiment, assume that every LU is comprised of a single LDEV. Alternatively, a plurality of LDEV's may be coupled to create a single LU. WORM, which is the acronym of Write Once Read Many, indicates an attribute of permitting a write only once and a read may times, where "1" indicates a storage area which has the WORM attribute. "Migration" indicates whether or not an associated logical volume has been migrated., where "1" indicates a migrated storage area. "FS" indicates the name of a file system established in the LV. "Remarks" indicates supplementary notes, for example, home indicative of a home file system, a date indicating when data was stored in the file system, and the like.

For example, the first row in FIG. 15A indicates that LV0 is comprised of LUN0, LUN0 is comprised of PLDEV0 established within the storage 1, and a file system PFS0 is created (this state is represented by LU0/STR0/PLDEV0/PFS0) and is defined as a home file system. Similarly, the second row in FIG. 15A indicates that LV1 has the configuration represented by LU1/STR0/PLDEV1/PFS1, and stores a file created in January 2003. In the following, this state is represented by a notation "LV1/LU1/STR0/PLDEV1/PFS1."

Here, the third embodiment shows an example in which each LV stores only files that were created on the same date.

Next, the operation involved in the LDEV migration will be described. Here, the migration will be described, by way of example, in an operational strategy which defines that at the beginning of next month, files remaining from the previous month are migrated from the storage 1 to a heterogeneous storage, and are changed to have the WORM attribute. This operational strategy is managed by DLCM 6001 which is a software application stored in a memory of a management terminal 600 installed external to the storage 1. DLCM is the acronym of Data Life Cycle Manager. As the DLCM 6001 is executed by the management terminal 600, the DLCM 6001 acquires management information, particularly, information in the volume management table 131 from the storage 1, so that the DLCM 6001 can know the configuration of the storage 1.

Assuming herein that it is, for example, on first February, 2003, the DLCM 6001 on the management terminal 600 first issues an execution instruction to the CHN0 of the storage 1 to create PLDEV2 through the management device 18. Upon receipt of this instruction, the CHN0 creates LV1/LUN2/STR0/PLDEV2/PFS2, and starts a file service.

Next, the DLCM 6001 sets the WORM attribute to files created in the previous month, i.e., "January 2003" based on the operational strategy, and determines to migrate these files from the storage 1 to the heterogeneous storage 500.

Specifically, the DLCM 6001 identifies that the files created in "January 2003" are stored in LV1/LUN1/STR0/

PLDEV1/PFS1 based on the information in the volume management table 131 shown in FIG. 15A.

Next, the DLCM 6001 issues an execution instruction to the DKC 11 of the storage 1 to set the WORM attribute to the LV1 through the management device 18. Upon receipt of this instruction, a WORM attribute program 111095 of the CHD0 sets the WORM attribute to the PLDEV1 corresponding to the LV1 which has been instructed to set the WORM attribute from the management device 18, to prohibit new write accesses. While the WORM attribute program 111095 prohibits new writes in the third embodiment, the present invention is not limited to this particular manner in the third embodiment, but the CHN0 or CHD0 may be provided with a function of prohibiting new write accesses.

Next, the DLCM 6001 determines the SLDEV 1 in the heterogeneous storage 500 as a destination LDEV for the migration. If no LDEV has been previously created, an LDEV creation instruction is issued to the DKC 11 of the storage 1 through the management device 18. As the CHD0 receives this instruction, the heterogeneous storage connection control program 11101 creates the SLDEV1.

Next, the DLCM 6001 issues an execution instruction to the DKC 11 of the storage 1 to migrate data in the PLDEV 1 to the SLDEV1 through the management device 18. As the CHD0 receives this instruction, the LDEV migration control program 11104 copies data contents in the PLDEV1 to the SLDEV1, i.e., heterogeneous storage 500 through the heterogeneous storage connection SAN 30. Upon completion of the copy, the LDEV migration control program 11104 erases the data in the PLDEV1. Upon completion of the migration, the volume control program 111093 of the CHD0 updates the volume management table 131.

Here, unlike new creation of the file system SFS1, information in the PFS1 has been moved as it is to the SLDEV, so that the CHN0 can create the SFS1 only by updating the name of the file system, and updating only other necessary data as required.

Thus, the migration has been completed for the LV1 which stores the file system PFS1 created in January. As a result, the volume management table 131 has changed as shown in FIG. 15B. The LV1 is represented as LV1/LUN1/STR1/SLDEV1/SFS1, and is set to have the WORM attribute.

Subsequently, in a similar manner, at the beginning of March 2003, the DLCM 6001 creates a logical volume LV3 for storing a file system PFS3 for storing files which will be created in March, and migrates the LV2 which has stored the file system PFS2 in February from the storage 1 to the heterogeneous storage 500. As a result, the LV2 is represented as LV2/LUN2/STR1/SLDEV2/SFS2, as shown in FIG. 15C, and is set to have the WORM attribute. As a result of the foregoing, the configuration is finally defined as shown in FIG. 14.

Thus, the PLDEV1 and PLDEV2 have been migrated to the SLDEV1 and SLDEV2, respectively, in which case the LV1/LU1 or LV2/LU2 have not at all been changed. Since the file system after the migration is mounted to the home file system PFS0, the executed migration is not recognized from the host. Also, since the LDEV migration control program manages address pointers in course of the migration, an access from a host, if any during the migration, would not be interrupted, or would not result in a transfer of erroneous data. As a result, perfect transparency and single view are ensured over the overall file system from the host. Such a function is called the "Single View migration based on heterogeneous storage connection NAS."

In the foregoing description, the creation of a volume and the migration are executed by the DLCM 6001 on the management terminal 600. Alternatively, the function of the DLCM 6001 may be incorporated in an application in the host, or the DLCM 6001 may be run on the host, or the DLCM 6001 may be run on the management device 18 within the storage. Particularly, when the DLCM function is incorporated in an application in the host, more accurate control can be conducted to fit to the characteristics and operation of the application. In this event, an interface between the DLCM 6001 and storage 1 is defined as API, so that the individual operation described above is provided as API.

The foregoing description excludes differences except for those in the configuration of the controller between the storage 1 and heterogeneous storage 500. For example, the storage 1 may employ high performance disks 17xx each having an FC interface, while the heterogeneous storage 500 may employ inexpensive disks 5170x each having an ATA interface, such that the high performance FC disks may be utilized in a period in which rewrites are frequently performed from me establishment of a file system, while the low-cost ATA disks may be utilized in a period in which the storage is a main purpose. The resulting storage system provides high cost performance through such purpose use. This is particularly effective in building a storage system which employs low-cost ATA disks for archiving data over time. The storage system can be adapted to a variety of applications such as a backup of a file system, archiving of E-mails, archiving of logs, archiving of monitoring images, and the like, thus presenting an extremely high utility value.

With the foregoing embodiments, independent file systems can be created over a plurality of logical volumes of storages, and combined into a single tree, so that the host can be provided with a single view file system.

Also, a logical volume can be created in a storage area on a heterogeneous storage, and an entire file system can be migrated by a migration function of a heterogeneous storage connection function, while maintaining the single view feature.

Also, in the event of migration, the WORM attribute can be added to a logical volume to prohibit the logical volume from rewriting.

Further, the creation of a volume and the migration can be carried out in accordance with a predefined strategy through a control from a management terminal external to the storage or from the host.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A first storage system connected to a management terminal, a computer, and a second storage system, comprising:
a memory;
a first storage device which stores data related to a first file system;
a first controller which provides the first file system and a second file system to a computer; and
a second controller for controlling input/output operations to/from the second storage system with location of data related to the second file system,
wherein the second storage system includes a second storage device which stores the data related to the second file system and a third controller, connected to the second controller, for controlling the second storage device,
wherein the first controller mounts a root directory of the second file system at a mount point of the first file system in the first storage system such that the first and second file systems are provided to the computer as a single directory tree, wherein the second controller accesses the second storage system with a command representing an area where the data related to the second file system is stored in the second storage device, wherein the first storage system is coupled to the second storage system via a storage area network (SAN) and communicates therewith according to a block input/output (I/O) interface, wherein the first storage system is coupled to the computer via a local area network (LAN) and communicates therewith according to a file I/O interface, wherein each of the first storage device and the second storage device configures a plurality of logical volumes, wherein the second storage system is of a type different from the first storage system, and when a request to access the second file system is received from the computer, the first controller converts the request into a command for a logical volume of the second storage device, and the second controller sends the command to the second storage system, via the third controller, wherein the memory stores a volume management table, which comprises:

a logical volume identifier that identifies each of the plurality of logical Volumes, wherein each of the plurality of logical volumes stores only files that were created on a same date;

a Write Once Read Many (WORM) identifier that provides a WORM attribute indicating whether a write only once and a read many times operation is permitted for each of the plurality of logical volumes; and a file system identifier that identifies either a primary file system or a secondary file system corresponding to each of the plurality of logical volumes, wherein the primary file system is stored in the first storage system and the secondary file system is stored in the second storage system, wherein the volume management table further comprises, for each of the plurality of logical volumes other than the logical volume corresponding to a primary file system comprising the first file system, a date that indicates when files were stored in the primary file system, wherein at a second date, the files stored in the primary file system on a first date are migrated from the first storage system to the secondary file system in the second storage system, wherein after migration at the second date, the management terminal updates the file system identifier in the volume management table to indicate that the files migrated from the primary file system are now stored in the secondary file system, and updates the WORM identifier corresponding to the files stored on the first date to indicate that the write only once and a read many times operation is permitted for the files stored on the first date, and the secondary file system is mounted on the first file system such that the migration is not recognized by the computer, and wherein the single directory tree has a total capacity including a capacity of the first storage device and a capacity of the second storage device, and the computer has a transparent single view of the second file system without being aware of whether the second file system resides in the first storage system or the second storage system.

2. A first storage system according to claim 1, wherein the first storage system is connected to the computer via a first network, and the second storage system is connected to the computer via a second network different from the first network.

3. A first storage system according to claim 1, wherein the first controller receives an access request for a file from the computer, if the access request identifies a file configuring data stored in the second storage device, the first controller accesses data related to the file stored in the second storage device through the second controller.

4. A first storage system according to claim 1, wherein the first controller manages location of data related to the first file system and the second file system, if the first controller receives a request for data related to the second file system, and wherein the first controller sends location of data to the second storage system via the second controller.

5. A first storage system according to claim 1, wherein each of the first storage device and the second storage device configuring a plurality of logical volumes, wherein the first controller manages relationship between either the first or the second file system and a logical volume of said plurality of logical volumes related to either the first file system or the second file system, if a request for the second file system is received, the first controller specifies the location of the logical volume is configured to the second storage device in the second storage system according to the relationship, and wherein the first controller sends information related to the logical volume to the second controller, the second controller sends a command, to the second storage system via a communication line, including the information related to the logical volume to the second controller.

* * * * *